Nov. 3, 1936.  L. ALTPETER  2,059,191
DEHYDRATION APPARATUS
Filed Nov. 30, 1934
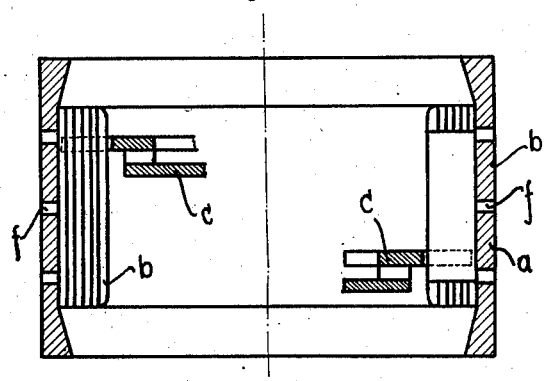
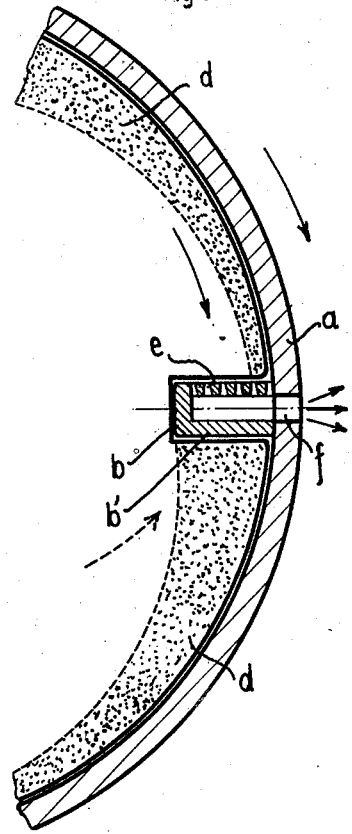
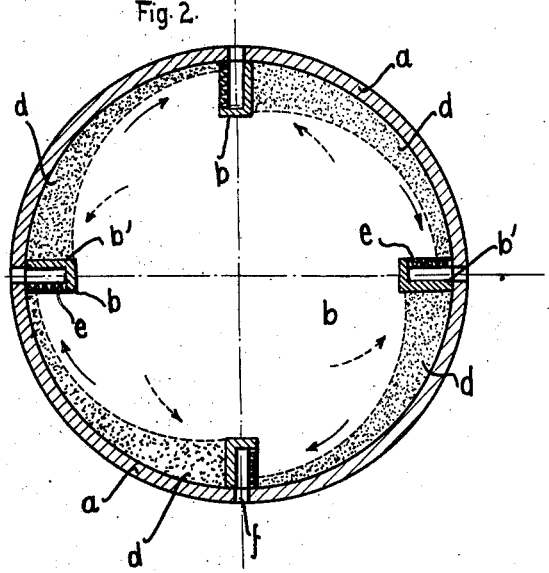
Inventor
Ludwig Altpeter Patented Nov. 3, 1936

2,059,191

UNITED STATES PATENT OFFICE 2,059,191

DEHYDRATION APPARATUS

Ludwig Altpeter, Essen, Germany

Application November 30, 1934, Serial No. 755,463
In Germany December 2, 1933

2 Claims. (Cl. 210—76)

The invention relates to an improvement in centrifugal dehydration apparatus such as are described in my specifications Nos. 1,944,391 and 1,962,048 and is specially concerned with the hollow bodies for draining the liquid from material ranging from a fine granular material to sludge contained in a centrifuging drum having an imperforate casing and provided with a vertically reciprocating plate for spreading and discharging the material under treatment. The elongated hollow draining bodies, which advantageously consist of separate parts, are mounted on the inner periphery of the cylindrical drum casing and extend into the material which is to undergo centrifuging.

The hollow draining bodies hitherto employed are provided all round with slots or holes, through which the liquid flows from the material being dewatered at all levels and in all directions radially through the hollow bodies.

When dewatering material in the form of very fine grains—such as flotation slurry from coal washing, furnace gas slurry, and the like, it has been found that with these hollow draining bodies a very high percentage of the granular material passes out of the centrifuging drum with the waste water. This disadvantage is not avoided merely by reducing the width of the slots, because this simply leads to the slots becoming choked; furthermore, the grains of the material are so fine that they easily pass through the narrowest slots. Furthermore, at the very high speed at which the waste water is discharged through the hollow draining bodies in a direction opposite to the direction of rotation of the centrifuging drum, sharp-edged solid matter is continuously carried away and after a short period causes wear and so widens the slots. Such wear is equivalent to a widening of the slots and results in an increase in the quantity of discharged solid matter in the material being centrifuged.

The heavy discharge of solid matter with the waste water is assisted by the fresh material introduced into the centrifuging drum impinging against the water discharge slots in the hollow draining bodies which project into the centrifuging drum and collecting there. As the waste water is discharged through the slots in the hollow draining bodies in a direction opposite to the direction of rotation of the drum, the finest grains of the material which are floating in the liquid do not settle on the sides of the drum notwithstanding the centrifugal action involved and therefore to a large extent they are carried away through the slots in the hollow draining bodies as solid particles in the stream of water. The invention avoids this disadvantage.

According to the invention the hollow draining bodies provided inside the cylindrical drum casing are provided with imperforate walls, that is to say, without slots or holes, on the side which is at the front when considered with respect to the direction of rotation of the drum, within the lifting distance of the plate for spreading and discharging the material. The whole of the opposite wall of the hollow draining bodies, so far as it is surrounded constantly by centrifuged material, is provided with slots or holes. In this construction of the hollow draining bodies the waste water, so far as it does not seep through the centrifuged material to the slots in the hollow bodies, may pass towards the slots in the hollow discharge bodies only from the side which is at the rear considered with respect to the direction of rotation of the drum, that is to say, in the opposite direction to the direction of entry into the centrifuging drum. Owing to this the solid matter in the inflowing material has the time and opportunity to settle on the inside walls of the drum under centrifugal action.

The centrifuged material settles, in falling from one hollow draining body to the next, on the inside walls of the drum, and the waste water from the material being treated passes on the surface of this material in a slow stream to the rear of the hollow draining bodies and escapes through the slots in the hollow bodies and through the holes in the drum.

The accompanying drawing diagrammatically illustrates, by way of example, apparatus according to the invention.

Figure 1 is a vertical section through a cylindrical centrifuging drum provided with the hollow draining bodies.

Figure 2 is a cross-section through the centrifuging drum provided inside with the hollow draining bodies, and Figure 3 is a cross-section on an enlarged scale through a part of the drum.

The hollow draining bodies $b$ provided inside the cylindrical drum $a$ are formed without slots or holes within the lifting distance of the plate $c$ for spreading and discharging the material on the side at $b'$ which is at the front considered with respect to the direction of rotation of the drum. In the left-hand half of Figure 1 the plate $c$ for spreading and discharging the centrifuged material is shown in its upper position, and is shown in its lower position in the right-hand half of the drawing. The material to be centrifuged enters in the direction indicated by the dotted arrow (Figures 2 and 3) and settles inside the drum $a$ between the hollow draining bodies as shown dotted at $d$ so that the discharge slots $e$ in the hollow draining bodies $b$ are, in their effect, opposed to the direction of rotation of the centrifuging drum (arrows in full lines). The outlets for the liquid in the casing of the drum $a$ are marked $f$.

I claim:

1. In a centrifugal dehydration apparatus comprising a centrifuging drum, means for rotating the said drum, a distributor adapted for rotation and for reciprocation along the axis of the drum, means for rotating and reciprocating the distributor and means for feeding the material to be centrifuged to the distributor, a hollow body for draining the liquid from the material to be centrifuged, said hollow body being disposed against the wall of the drum parallel with the axis to extend into the material and presenting an imperforate surface at the forward side, considered in the direction of rotation of the drum, the rear side surface being formed with slots or holes, and outlet means for discharging to the exterior of the drum the liquid passing into the hollow bodies.

2. In a centrifuging dehydration apparatus, a rotatable centrifuging drum and perforated hollow draining bodies disposed upon the inner walls of the said drum, the said hollow bodies projecting towards the axis of the drum into the material to be centrifuged to receive the liquid therefrom and having an imperforate surface at the forward side, considered in the direction of rotation of the drum, and outlet means for discharging to the exterior of the drum the liquid passing into the hollow bodies.

LUDWIG ALTPETER.